Patented June 12, 1934

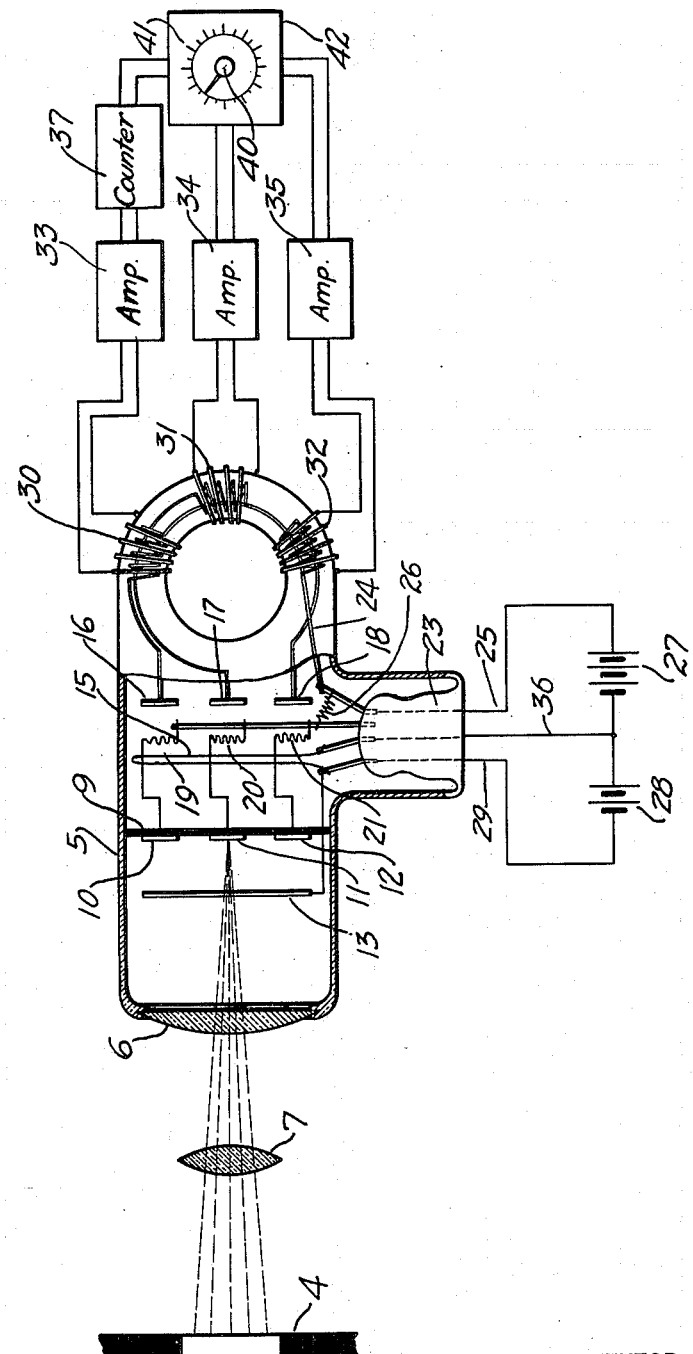

1,962,208

UNITED STATES PATENT OFFICE 1,962,208

PHOTOELECTRIC-VECTOR-ANALYZER

Alexander McLean Nicolson, New York, N. Y., assignor to Communication Patents, Inc., New York, N. Y., a corporation of Delaware Application August 2, 1930, Serial No. 472,591

9 Claims. (Cl. 250—41.5)

This invention relates to a method of and means for determining the value of complex quantities, and particularly the direction and rate of speed of objects in motion.

An object of the invention is to determine the value of complex quantities having absolute and directional constituents.

Another object of the invention is to determine the velocity of objects in motion, and the direction thereof.

A further object of the invention is to provide a compound unitary photoelectric thermionic cell with simplified power supply.

Many quantities, especially those involving the values of alternating currents are represented by vectors having both moduli and arguments. The instantaneous values of these quantities are not correct or accurate for many purposes unless both portions of the quantities are given, the modulus representing the absolute value, and the argument representing direction or rotation. In mechanical notations a compound quantity may be a moving object having a certain speed and traveling in a certain direction. It is desirable in these instances to know both conditions of an object in order to properly locate it and mathematically make computations.

The travel of an electrical current or of an object causes effects, both of which can be transformed into light changes, the results of which may be evidenced by interference bands of dark and light areas or traveling light spots. The motion of the object reflecting the light may be determined by determining the motion of the light spot or interference bands. Also arcing and corona effects at various points in transmission lines produce light changes, the determination of the occurrence thereof providing necessary data for their study.

The present invention is adaptable to the analysis of the above phenomena as well as being able to determine the speed at which an object moves and the direction of the movement, together with the frequency of occurrence of the movement. This is accomplished by the use of a compound photo-thermionic device, in which light affected by the moving objects actuates a plurality of photosensitized elements which in turn actuate an indicating device for determining the motion and the direction thereof. The device is simple, compact, and is so constructed as to be especially unitary. The action of the photoelectric cell controls the thermionic devices, which in turn supply the energy to an indicating meter.

The invention will be more fully understood from the following description with reference to the accompanying drawing in which such a device is shown in partial cross section, together with its associate circuits in diagrammatic form.

The activating medium shown in the drawing is that of a light interference band 4, bounded by its immediate dark areas. As this band is propagated in either direction on some interfering medium in accordance with the movement of some object, the photosensitized elements will be activated in succession to indicate the motion and its direction.

An object or thing cannot be said to move from one place to another unless it passes in succession through every intermediate place. It is possible, therefore, to determine a movement both as to its rate and direction if it is recognized and identified at several intermediate places.

The interference light pattern, therefore, as shown, may be caused by the movement of a reflecting surface with respect to a medium upon which the interference pattern is formed, the pattern being detected at various places and time instants. Periodic reflected or intercepted light from a moving object may function as light bands, the detection of the light at various points providing an indication of the speed and direction of the object. Light points may be produced by the flow of current along a conductor, an analysis of which can be made by the means disclosed hereinafter.

The construction of the vector-analyzer comprises an envelope 5 which may be of any substance such as glass and the like, in one end of which a lens 6 is positioned to concentrate the light rays falling thereon. A short focus lens 7 may also be employed to aid in focussing a source of light. The envelope 5 is divided into two sections by an opaque partition 9, upon which is mounted a plurality of photosensitive cathode elements 10, 11 and 12. In front of these elements is a photocell anode 13, common to all the cathode elements, which may be in the form of a metallic ring or grid.

In the other division of the tube will be found a thermionic cathode 15, three thermionic anodes 16, 17, and 18, and three thermionic grids 19, 20 and 21, respectively. These elements are mounted on a glass stem 23 of the tube in any manner well known in the vacuum tube art. Both sides of the tube are evacuated.

The right hand portion of the tube is formed as a loop in which the primary of output transformers are located. Each anode is connected to a primary located in this loop, all of which are connected to a common B potential lead 24, and to the output conductor 25, which leads to the positive terminal of the anode supply 27. The filament or cathode 15 common to all grids and anodes is energized from a current source 28 through conductors 29 and 36. The potential for the photocell elements is obtained from the source 27, but this source is reduced by a resistance 26 located internally of the tube.

The primaries of the thermionic output circuits have associated therewith secondary windings 30, 31, 32, which connect with respective amplifiers 33, 34 and 35. In the circuit of secondary 30 and amplifier 33 is an impulse relay or counter 37, which registers the number of current impulses flowing through this circuit. The ouputs to the three amplifiers are fed to a motor system composed of the three circuits terminating in stator windings displaced 120° to form a rotating field. To a monopolar armature positioned in this field is attached a deflectable pointer 40 associated with a tachometer scale 41. Light impulses received from cathodes 10 to 12 in that order will be indicated by the motion of the pointer 40 in one direction, while impulses impressed from cathodes 12 to 10 will deflect the pointer in the opposite direction. The speed at which the impulses are received on the light cathodes will be registered by the amount of deflection of the pointer in accordance with the dial calibrations. The pointer may be made rotatable, the number of rotations within a certain time unit determining the speed of actuation of the photocells. A magnetic indicator of the speedometer type may also be provided to indicate the speed of movement of the light impulses at any instant.

In the operation of this circuit light from one of the source types previously mentioned may be impinged upon the photosensitive elements 10, 11 and 12, respectively, in that order. Upon actuation of cathode 10, current flows in the photocell circuit, which includes the control electrode 19. This current releases electrons from the filament 15 which, because of the space association of the elements, pass to anode 16, giving rise to an impulse of current in this anode circuit. This impulse is transferred to the secondary 30, is amplified in amplifier 33, operates counter 37, and polarizes one third of the stator of tachometer 41. The pointer then adjusts itself if the last impulse was not received over this circuit. When a second light impulse is received on cathode 11, the same operation occurs and the pointer rotates farther. If the impulses are sufficiently rapid, the pointer will continue to rotate. When the cathode elements are energized in the reverse order, the reverse direction is indicated by the pointer.

The transformer arrangement may be varied to ordinary transformers, but the disclosed system is preferable as it permits of the introduction of differently wound secondaries without disturbing the primaries. For instance, secondary units containing varying arrangements of windings may be inserted within the loop section of the tube.

Furthermore, a device embodying the invention may only contain two sets of elements or any number thereof, depending upon the nature of the light source and the results desired. It has also been found that by arranging the thermionic anodes directly opposite the light sensitive cathodes, no grid structure is required. To make the individual actions more positive, however, each anode may be isolated by glass or screen mesh partitions within the envelope.

The above vector-analyzer may be employed in counter systems where the usual type of photocell is now employed, a source of light being projected on the moving objects. With the invention as disclosed, not only will the number of objects be observed, but their speed and direction could be determined instantly in remote places. There are many other uses to which this analyzer may be put by slight modifications within the scope of the appended claims.

What is claimed is:

1. In combination, a photosensitive device having a plurality of elements, thermionic devices individually connected to each of said elements, individual output circuits for each of said thermionic devices and means for combining the energy in each of said output circuits for indicating the actuation of said photosensitive device and the rate of actuation thereof.

2. A combination in accordance with claim 1, in which said photosensitive device and said thermionic device are contained in the same envelope and said means includes a transformer having primary windings in said envelope.

3. In combination, a plurality of photosensitive devices, a corresponding plurality of thermionic devices intimately associated therewith and activated thereby, individual output circuits for each of said thermionic devices, and means combining the energy in said output circuits for producing a physical motion in accordance with the activation of said photosensitive devices, said means also determining the rate of activation of said devices.

4. In a system for the detection of the motion of light and its direction, a plurality of means energized by said light in a certain order, and means actuated by said last mentioned means for indicating the occurrence of said light on said last mentioned means and the rate of occurrence thereof.

5. In a vector analyzer, a plurality of photosensitive devices adapted to be actuated in various orders, means for respectively transmitting the outputs of said devices in individual channels, and means for combining the outputs of said channels for registering actuation, direction and rate of actuation of said devices.

6. In combination, a unitary housing enclosing a photoelectric cell having a plurality of anodes and control electrodes, said anodes having output circuits included in said housing, means for transmitting the output currents to a work circuit common to all of said output circuits, and means for indicating the presence, direction and rate of occurrence of current impulses in said output circuit.

7. In a system for the detection of motion and its direction, a plurality of light sensitive elements arranged to be activated in serial order, a plurality of thermionic devices connected to said light sensitive elements, a plurality of output circuits connected to said thermionic devices, and means inductively coupled to said output circuits for indicating the direction and magnitude of the actuation of said light sensitive elements.

8. In combination, a plurality of light sensitive elements, a corresponding plurality of thermionic devices connected to respective light sensitive elements, a plurality of primary windings connected in the respective output circuits of said thermionic devices, an evacuated housing enclosing all of said aforementioned elements, light impulses on said photo sensitive elements being transmitted to respective primaries therein, a plurality of secondary wndings inductively coupled to said primary windings, means connected to said secondaries, said means creating a rotating magnetic field when impulses are received on said light sensitive elements in serial order and means located within said magnetic field for indicating the magnitude, and direction of said impulses.

9. In a system for the detection of the presence of radiations and their direction of motion, a plurality of means energized by said radiations in a certain order, and means actuated by said last mentioned means for indicating the occurrence of said radiations and their rate of occurrence.

ALEXANDER McLEAN NICOLSON.